I. J. Richardson,
Horse Power.
No. 4,374. Patented Feb. 10, 1846.
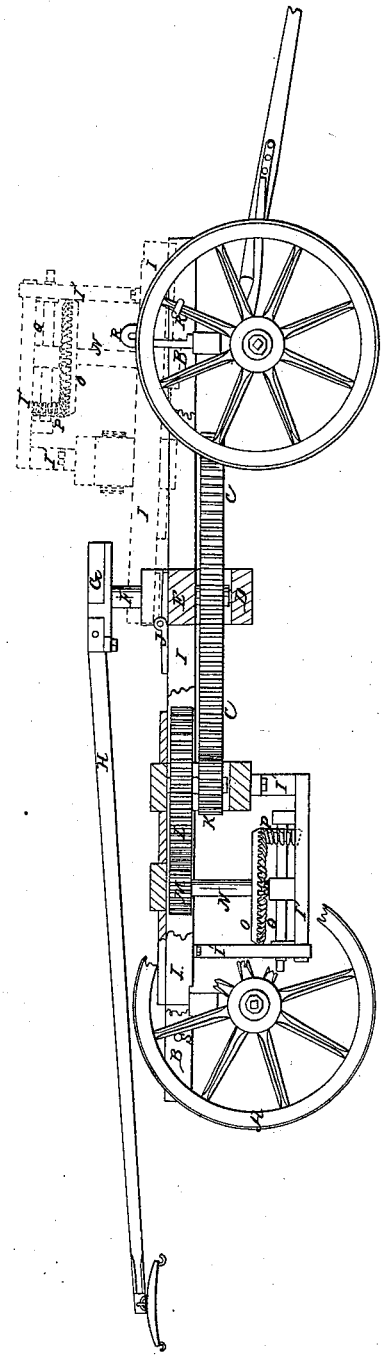

UNITED STATES PATENT OFFICE.

ISRAEL J. RICHARDSON, OF NEW YORK, N. Y.

PORTABLE HORSE-POWER.

Specification of Letters Patent No. 4,374, dated February 10, 1846.

*To all whom it may concern:*

Be it known that I, ISRAEL J. RICHARDSON, of the city of New York, in the State of New York, have made a new and useful improvement in the manner of constructing horsepowers for the purpose of driving machinery of various kinds; and I do hereby declare that the following is a full and exact description thereof.

This machine I denominate a locomotive-horse-power as it is to be permanently stationed on a four wheeled carriage which will admit of its being readily removed from one situation to another; and when used the wheels are to be locked so as to keep it steadily in place. The horses are to be made to actuate the machine by drawing upon levers or sweeps, said levers being attached to a cap piece adapted to receive them, and placed on the shaft of the main driving, or master wheel. This wheel, which gives motion to a train of wheels that drives a line shaft, is situated immediately below, and nearly in contact with the bed of the carriage, where it remains at all times, whether the machine be stationary, or in the act of being transported from place to place, and when the machine is in operation the other wheels of the train are also situated below the bed of the carriage; but the wheels which connect the main driving wheel with the line shaft, have their bearings in an independent frame which is connected to the bed of the carriage by hinge joints, and when the machine is to be transported, this independent frame with its train of wheels is turned over so as to reverse the position of said wheels and to cause them to occupy a situation above and in front of the bed of the carriage, which is thereby left free to be hauled about, which could not otherwise be done as the wheel work would approach too near to the ground to allow of its safe removal.

In the accompanying drawing, the parts represented in dark lines and shaded with India ink, is a side elevation of the carriage with the respective wheels in the position which they occupy when the machine is in action. The part drawn in red lines and shaded with the same color represents the independent frame with its train of wheels turned up on the bed of the carriage, in a proper position for removal.

A A are the carriage wheels, which I make of equal size and about three feet in diameter. The axles of these wheels I place about eight feet apart and they have on them, bolsters which support the bed of the carriage in the usual manner.

The side frame timbers B, B, which rest on the bolsters may be about twelve feet long; the side timber is represented as in part cut away, as is also a part of the timber of the independent frame for the purpose of showing the gearing.

C C is the main driving wheel which I have made four feet in diameter.

D is a cross timber which sustains the step of the shaft of this wheel, its upper bearing being in the cross timber E attached to the main frame. The shaft F of the wheel C receives at its upper end the cap G to which one or more sweeps or levers H are attached in any of the known ways; these sweeps must of course be sufficiently elevated to pass around clear of the wheels.

I, I, is one of the side pieces of the independent frame (a part of which is supposed to be cut away), which frame sustains all the wheels excepting the main driving wheel C. This frame is connected to the main frame of the carriage by strong hinges J on each side of the machine allowing said frame with its respective wheels to be turned over on the fore part of the carriage and to occupy the situation designated by the part colored red. When it is to be turned back the sweeps H are to be removed from the shaft F.

The driving wheel C gears into a pinion K which I have made of eight inches diameter; upon the same shaft with this pinion is the spur wheel L, say of twenty-two inches in diameter; this gears into a pinion M of seven inches in diameter. On the shaft N of this pinion is the bevel wheel O of eighteen inches diameter that gears into the bevel pinion P of six inches diameter; this last pinion is affixed on a line shaft Q said shaft being supported on proper bearings; to this line shaft may be coupled another leading to the machinery to be driven; or it may carry a whirl to receive a band for a like purpose.

I' I' are parts of the independent frame that receive and sustain the gearing just described. The parts of this gearing which are drawn with the red pigment are designated by the same letters of reference that are used on the corresponding parts of the india ink drawing.

I have devised a very simple and convenient mode of locking the respective wheels by means of the standards or stakes R, R, that are ordinarily received in holes in the bolsters to aid in securing whatever may be placed on the carriage. These standards I make of iron and I curve them over at their upper ends as represented, the space in the hooked or curved part being adapted to receive one of the spokes of the wheels. In the side timbers of this carriage I bore holes as at S to receive these standards allowing their hooked ends to embrace the spokes as shown at R'.

When the machine is to be removed, the independent frame being turned up as described and represented, a space is left in the hinder part of the carriage for carrying a threshing machine, a grain cleaner, or any other apparatus which it may be desirable to transport with the horse-power.

Having thus fully described the manner in which I construct, combine and arrange the respective parts of my locomotive horse power for driving machinery, I do hereby declare that I do not make any claim to the manner of arranging the wheels and pinions which constitute the gearing, such gearing being of a kind well known to machinists; but

What I do claim as new and desire to secure by Letters Patent is—

The placing of the master wheel beneath the main beams or body of the carriage in such manner as that it can remain permanently attached in its place as described in combination with the placing of the residue of the machinery in a separate frame to turn over upon hinges, or a hinge or pivot as above set forth, thereby removing all impediment to its transportation and admitting of the whole being instantly replaced in gear by turning the independent frame back into its working position.

ISRAEL J. RICHARDSON.

Witnesses:
  THOS. P. JONES,
  EDWIN L. BRUNDAGE.